US012756259B2

(12) United States Patent
Conde

(10) Patent No.: US 12,756,259 B2
(45) Date of Patent: Oct. 6, 2026

(54) ALTERNATOR SYSTEM

(71) Applicant: Kandas Conde, Staten Island, NY (US)

(72) Inventor: Kandas Conde, Staten Island, NY (US)

(*) Notice: Subject to any disclaimer, the term of this patent is extended or adjusted under 35 U.S.C. 154(b) by 247 days.

(21) Appl. No.: 18/650,850

(22) Filed: Apr. 30, 2024

(65) Prior Publication Data

US 2025/0337296 A1 Oct. 30, 2025

(51) Int. Cl.
*H02K 5/14* (2006.01)

(52) U.S. Cl.
CPC .................................... *H02K 5/141* (2013.01)

(58) Field of Classification Search
CPC ...................................................... H02K 5/141
See application file for complete search history.

(56) References Cited

U.S. PATENT DOCUMENTS 3,659,188 A * 4/1972 Alexander ................ H02J 7/16
322/73
7,067,949 B2 * 6/2006 Kometani .............. H02K 1/165
310/179
2016/0111838 A1 * 4/2016 Cutsforth ............. H01R 39/381
310/68 B

FOREIGN PATENT DOCUMENTS

WO WO-2021249813 A1 * 12/2021 ............... F03D 9/25

* cited by examiner

*Primary Examiner* — Terrance L Kenerly
(74) *Attorney, Agent, or Firm* — NGUYEN TARBET IP LAW

(57) ABSTRACT

A carbon brush configured to be implemented in an alternator device. The carbon brush includes a carbon block configured to deliver a current and a health sensor operatively coupled to the carbon block configured to detect a lifespan of the carbon block and alert a user when the lifespan reaches a predetermined threshold. Alerting the user when the lifespan reaches the predetermined threshold may comprise actuating one or more warning lights.

15 Claims, 2 Drawing Sheets

ALTERNATOR SYSTEM

FIELD OF THE INVENTION

The present invention is directed to an alternator system comprising a carbon brush level warning sensor.

BACKGROUND OF THE INVENTION

Many electrical machines implement a combination of both stationary parts and rotating parts. Electric motors, alternators, and electric generators are examples of such electrical machines. For such devices, certain components are required for conducting current between rotating and stationary components. In some applications, slip rings are used, attaching to a shaft component of a rotor, with springs pressing braided copper wire brushes onto the slip rings to conduct current. In more recent applications, carbon brushes are used in place of the usual copper brushes. These carbon brushes comprise graphite components, allowing for high enough resistance to provide a gradual shift of current from the rotor to stationary components. However, these graphite components wear down over time, leading to device malfunction and the need for replacement. Thus, there exists a present need for a carbon brush able to deliver an external warning near the end of its lifespan to allow for replacement without the system malfunctioning.

BRIEF SUMMARY OF THE INVENTION

It is an objective of the present invention to provide systems and devices that allow for an alternator system comprising a carbon brush level warning sensor, as specified in the independent claims. Embodiments of the invention are given in the dependent claims. Embodiments of the present invention can be freely combined with each other if they are not mutually exclusive.

The present invention features a carbon brush configured to be implemented in an alternator device. The carbon brush may comprise a carbon block configured to deliver a current and a health sensor operatively coupled to the carbon block configured to detect a lifespan of the carbon block and alert a user when the lifespan reaches a predetermined threshold. In some embodiments, alerting the user when the lifespan reaches the predetermined threshold may comprise actuating one or more warning lights operatively coupled to one or more slip rings.

The present invention relates to a new or novel carbon brush with an incorporated sensor system to provide a warning at a predetermined low level before the carbon brush runs out or finishes, which would cause the alternator to break down or fail. This novel carbon brush sensor can be incorporated into any carbon brush device to prevent an unprecedented breakdown caused by the carbon brush running out or finishing without any warning. Unlike prior alternator systems, the alternator system of the present invention will provide a warning months before a breakdown, allowing for a greater amount of time to replace the carbon brush.

One of the unique and inventive technical features of the present invention is the incorporation of a health sensor into a carbon brush. Without wishing to limit the invention to any theory or mechanism, it is believed that the technical feature of the present invention advantageously provides for early prevention of breakdowns in alternator systems. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
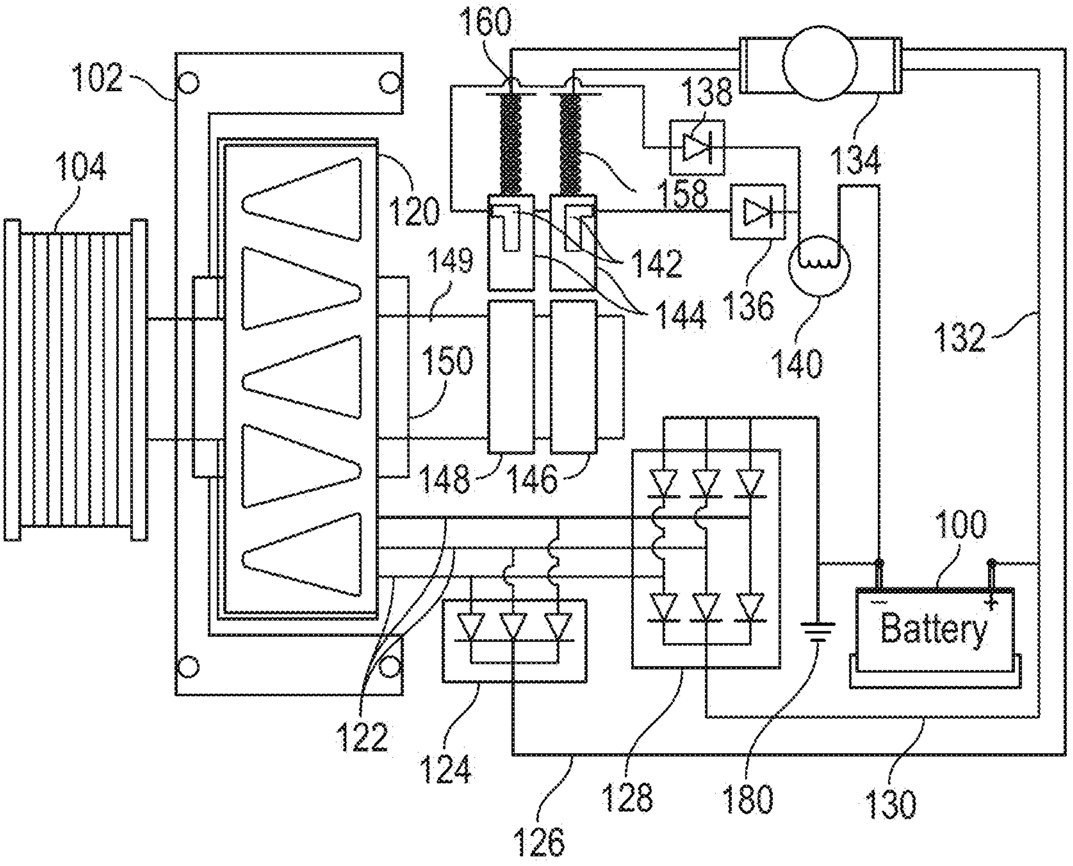
FIG. 1 shows a schematic view of the alternator system with the carbon brush health sensor system.

Following is a list of elements corresponding to a particular element referred to herein:

100 battery
102 frame
104 pulley
120 stator
122 stator output wire
124 diode trio
126 diode trio output
128 rectifier
130 rectifier output
132 battery output
134 regulator
136 carbon brush sensor diode for battery output
138 carbon brush sensor diode for diode trio output
140 carbon brush level warning light
142 carbon tube sensor
144 carbon brush with level warning sensor
145 carbon block
146 carbon brush sensor slip ring for battery output
148 carbon brush sensor slip ring for diode trio output
149 shaft component
150 rotor
152 carbon tube sensor thermal insulator
154 carbon tube sensor connection wire
156 carbon brush sensor warning level
158 spring
160 wire connection pole
180 ground The term "diode" is defined herein as a semiconductor device with two terminals (input and output), typically allowing the flow of current in one direction only.

The term "diode trio" is defined herein as a set of three diodes with input terminals connected to the three voltage outputs of a stator and output terminals all coupled into a single output.

The term "alternating current" is defined herein as a type of electrical current, in which the direction of the flow of electrons switches back and forth at regular intervals or cycles.

The term "direct current" is defined herein as an electric current that is uni-directional, so the flow of charge is always in the same direction.

The term "slip ring" is defined herein as an electric transmission device that allows energy flow between two electrical rotating parts, such as in a motor.

The term "ground connection" is defined herein as a safe path for electricity to run in the event of a short circuit.

Figure 2:
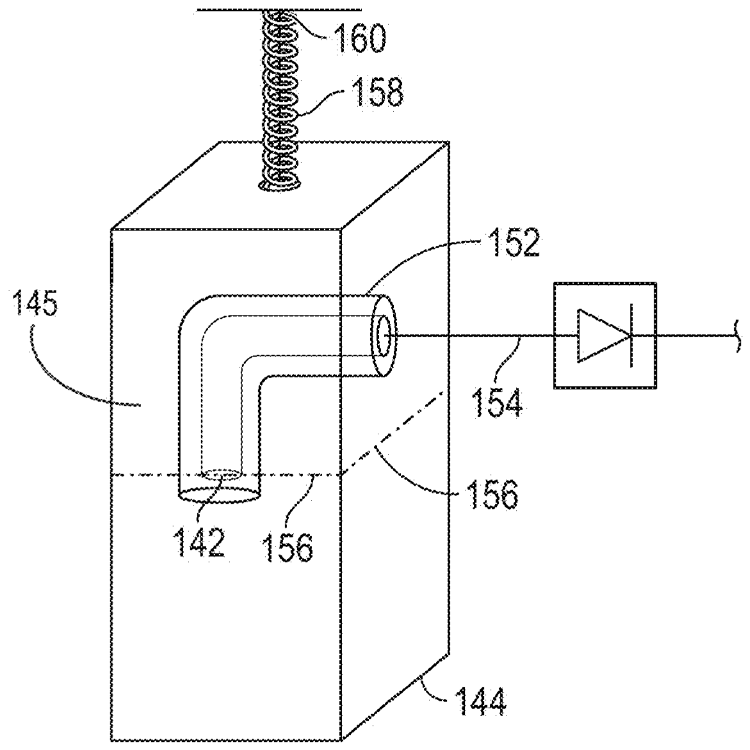
FIG. 2 shows a perspective view of the carbon brush with an incorporated health sensor.
Figure 3:
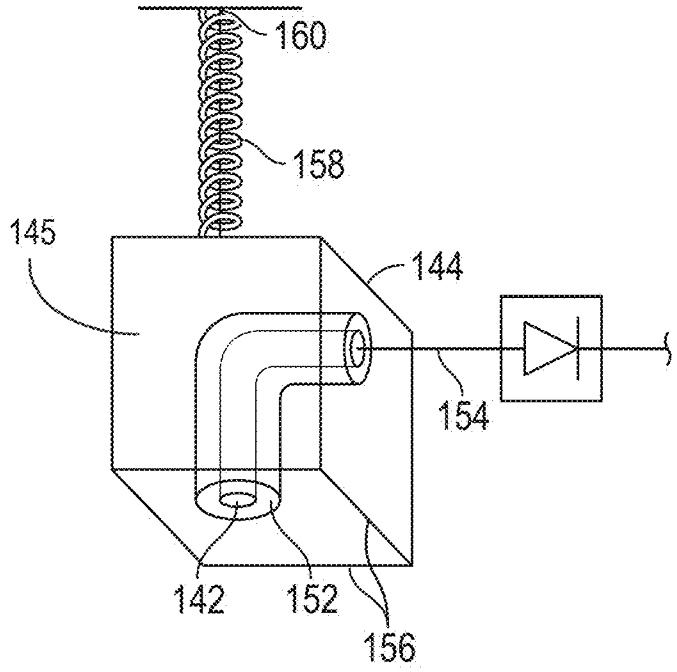
FIG. 3 shows a bottom view of the carbon brush at the warning level.

Referring now to FIGS. 2-3, the present invention features a carbon brush (144) configured to be implemented in an alternator device. The carbon brush (144) may comprise a carbon block (145) configured to deliver a current and a health sensor operatively coupled to the carbon block (145) configured to detect a lifespan of the carbon block (145) and alert a user when the lifespan reaches a predetermined threshold. In some embodiments, alerting the user when the lifespan reaches the predetermined threshold may comprise actuating one or more warning lights (140) operatively coupled to one or more slip rings.

In some embodiments, the health sensor may comprise a carbon tube sensor (142) comprising a thermal insulator layer (152), disposed within the carbon block (145) such that when the carbon block (145) reaches the predetermined threshold, the thermal insulator layer (152) is at least partially removed and the carbon tube sensor (142) contacts the one or more slip rings such that a lifespan current is delivered to the one or more warning lights (140). In some embodiments, the lifespan current may be delivered through one or more diodes operatively coupled to the one or more slip rings to the one or more warning lights (140). In some embodiments, the one or more diodes may comprise a battery output diode (136) operatively coupled to a battery (100), a diode trio output diode (138) operatively coupled to a diode trio (124), or a combination thereof. In some embodiments, the lifespan current may comprise an alternating current. The alternating current may be delivered through a rectifier (128) operatively coupled to the one or more slip rings and the one or more warning lights (140), configured to convert the alternating current into a direct current. In some embodiments, the carbon block (145) may further comprise a copper interior component.

Referring now to FIG. 1, the present invention features an alternator device. In some embodiments, the device may comprise a shaft component (149) defining an axis and a rotor component (150) disposed on the shaft component (149), configured to rotate on the axis upon receiving a first current and rotation force. The device may further comprise one or more slip rings disposed along the shaft, configured to receive the first current and deliver the first current to the rotor component (150). The device may further comprise one or more carbon brushes disposed adjacent to the one or more slip rings such that the one or more carbon brushes contact the one or more slip rings, each carbon brush (144) comprising a carbon block (145) configured to deliver the first current to the one or more slip rings and a health sensor operatively coupled to the carbon block (145) configured to detect a lifespan of the carbon block (145) and alert a user when the lifespan reaches a predetermined threshold. The device may further comprise a battery (100) operatively coupled to the one or more carbon brushes, configured to deliver the first current to the one or more carbon brushes.

In some embodiments, the device may further comprise a stator component (120) disposed adjacent to the rotor component (150), comprising a stator magnet system. The rotor component (150) may comprise a rotor magnet system. The stator magnet system may be configured to generate a second current upon interacting with the rotor magnet system as the rotor component (150) rotates.

In some embodiments, the device may further comprise a rectifier (128) operatively coupled to the battery (100) and the stator component (120). The second current may comprise an alternating current. The rectifier (128) may be configured to convert the alternating current into a direct current.

In some embodiments, the stator component (120) may be operatively coupled to the battery (100) such that the second current is delivered to the battery (100), a plurality of external electrical components such that the second current is delivered to the plurality of external electrical components, or a combination thereof. In some embodiments, the device may further comprise a regulator (134) operatively coupled to the one or more carbon brushes and the battery (100), configured to regulate an amount of power in the first current.

In some embodiments, alerting the user when the lifespan reaches the predetermined threshold may comprise actuating one or more warning lights (140) operatively coupled to the one or more slip rings. In some embodiments, the health sensor may comprise a carbon tube sensor (142) comprising a thermal insulator layer (152), disposed within the carbon block (145) such that when the carbon block (145) reaches the predetermined threshold, the thermal insulator layer (152) is at least partially removed and the carbon tube sensor (142) contacts the one or more slip rings such that a lifespan current is delivered to the one or more warning lights (140). In some embodiments, the lifespan current may be delivered through one or more diodes operatively coupled to the one or more slip rings to the one or more warning lights (140). In some embodiments, the one or more diodes may comprise a battery output diode (136) operatively coupled to the battery (100), a diode trio output diode (138) operatively coupled to a diode trio (124) operatively coupled to a stator component (120), or a combination thereof.

In some embodiments, the lifespan current may comprise an alternating current. The alternating current may be delivered through a rectifier (128) operatively coupled to the one or more slip rings and the one or more warning lights (140), configured to convert the alternating current into a direct current. In some embodiments, the carbon block (145) may further comprise a copper interior component for aiding in delivering current to the slip rings.

The present invention features an alternator system. The system may comprise a shaft component (149) defining an axis and a rotor component (150) disposed on the shaft component (149), comprising a rotor magnet system, configured to rotate on the axis upon receiving a first current and rotation force. The system may further comprise one or more slip rings disposed along the shaft, configured to receive the first current and deliver the first current to the rotor component (150). The system may further comprise one or more warning lights (140) operatively coupled to the one or more slip rings. The system may further comprise one or more carbon brushes disposed adjacent to the one or more slip rings such that the one or more carbon brushes contact the one or more slip rings, each carbon brush (144) comprising a carbon block (145) configured to deliver the first current to the one or more slip rings and a health sensor operatively coupled to the carbon block (145) configured to detect a lifespan of the carbon block (145) and alert a user when the lifespan reaches a predetermined threshold. The health sensor may comprise a carbon tube sensor (142) comprising a thermal insulator layer (152), disposed within the carbon block (145) such that when the carbon block (145) reaches the predetermined threshold, the thermal insulator layer (152) is at least partially removed and the carbon tube sensor (142) contacts the one or more slip rings such that a lifespan current is delivered to the one or more warning lights (140) such that the one or more warning lights (140) turn on.

The system may further comprise a battery (100) operatively coupled to the one or more carbon brushes, configured to deliver the first current to the one or more carbon brushes. The system may further comprise a stator component (120) disposed adjacent to the rotor component (150), comprising a stator magnet system, configured to generate a second current upon interacting with the rotor magnet system as the rotor component (150) rotates. The system may further comprise a rectifier (128) operatively coupled to the battery (100) and the stator component (120), configured to convert the second current into a direct current. The system may further comprise a regulator (134) operatively coupled to the one or more carbon brushes and the battery (100), configured to regulate an amount of power in the first current.

In some embodiments, the present invention features an alternator system. The alternator system may comprise a frame (102) acting as a housing for the alternator system within which all other alternator system components are disposed. The system may further comprise a battery (100) configured to receive, store, and output electrical power. The battery (100) may direct power through a battery output (132) wire to a regulator (134). The regulator (134) may be configured to regulate the amount of power sent by the battery (100) through the battery output (132). From the regulator (134), the power may be directed to a plurality of wire connection poles (160) each comprising a spring (158) connecting the battery output (132) to a carbon brush (144). The carbon brush (144) may comprise a carbon tube sensor (142) disposed within that will be exposed over use of the carbon brush (144). Each carbon tube sensor (142) may comprise a thermal insulator (152) disposed around it. The carbon brush (144) may contact a slip ring for battery output (146) disposed on a shaft. The slip ring (146) may transfer the power to the rotor (150) also disposed on the shaft component (149) and interact with a stator (120). The rotor (150) may also receive rotational movement from a pulley (104) operatively coupled to the rotor (150), the shaft, or a combination thereof.

The stator (120), upon interacting with the rotor (150), may be configured to generate an alternating current directed through a stator output wire (122). The stator output wire (122) may direct the alternating current to both a diode trio (124) configured to direct the alternating current in a single direction, and a rectifier (128) configured to convert the alternating current into a direct current. From the diode trio (124), the alternating current is directed through a diode trio output (126) wire to the regulator (134) and then to another carbon brush (144) configured to contact a slip ring for the diode trio output (148). This power is used to continue to power the rotor (150). From the rectifier (128), the direct current is directed through a rectifier output (130) wire back to the battery (100) to be stored as power and/or directed to a plurality of additional electronic components. A ground connection (180) may also be disposed along the rectifier output (130) wire.

The carbon tube sensors (142) disposed within the carbon brushes (144) may be operatively coupled to carbon tube sensor connection wires (154). The connection wire (154) of the carbon tube sensor (142) of the carbon brush (144) configured to contact the battery output slip ring (146) may run through a carbon brush sensor diode for battery output (136) to one or more warning lights (140). The connection wire (154) of the carbon tube sensor (142) of the carbon brush (144) configured to contact the diode trio output slip ring (148) may run through a carbon brush sensor diode for diode trio output (138) to the one or more warning lights (140). Once the carbon brushes (144) degrade up to a warning level (156), the thermal insulator (152) layers are at least partially removed and the carbon tube sensors (142) contact the slip rings to accept a current that runs through the carbon tube sensor connection wires (154) to the one or more warning lights (140) that alert the user that the carbon brushes (144) have degraded and need to be replaced. In some embodiments, the carbon block (145) may comprise graphite, carbon fiber, carbon, or a combination thereof.

The present invention features an alternator system comprising a novel carbon brush with an incorporated level warning sensor system. In the present invention, upon activation or when the switch is turned on, the voltage of the battery (100) is initially sent to the rotor (150) via the regulator (134), the carbon brush sensor (144), and the slip ring (146). When the rotor (150) spins inside the stator (120), the alternator (102) generates DC voltage from the initial AC voltage generated by the stator (120). The AC voltage may be directed through the rectifier (128) and the rectifier output (130) to charge the battery (100). In some embodiments, the AC voltage may be directed through the rectifier (128) and the rectifier output (130) to power one or more additional electrical components. In some embodiments, the AC voltage may be directed through a diode trio (124) and a diode trio output (126) as a second energizing voltage to the rotor (150) via the regulator (134), the carbon brush sensor (144), and the slip ring (148).

In some embodiments, when the carbon brush sensor (144) reaches the warning level (156), the thin thermal insulation protection at the bottom of the carbon tube sensor (142) may break off such that the carbon brush sensor (144) the first slip ring (146) and the second slip ring (148) send at least a portion of the DC voltage from the regulator (134) to the warning light (140) through the diode for battery output (136) and the diode for diode trio output (138). At this point, the warning light (140) may then be turned on.

The alternator system of the present invention may be implemented into an electric generator, an automobile, a radio, a locomotive, a marine vehicle, an aviation vehicle, or a combination thereof.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A carbon brush (144) configured to be implemented in an alternator device, the carbon brush (144) comprising a carbon block (145) configured to deliver a current and a health sensor operatively coupled to the carbon block (145) configured to detect a lifespan of the carbon block (145) and alert a user when the lifespan reaches a predetermined threshold;

wherein alerting the user when the lifespan reaches the predetermined threshold comprises actuating one or more warning lights (140) operatively coupled to one or more slip rings;

wherein the health sensor comprises a carbon tube sensor (142) comprising a thermal insulator layer (152), disposed within the carbon block (145) such that when the carbon block (145) reaches the predetermined threshold, the thermal insulator layer (152) is at least partially removed and the carbon tube sensor (142) contacts the one or more slip rings such that a lifespan current is delivered to the one or more warning lights (140).

2. The carbon brush (144) of claim 1, wherein the lifespan current is delivered through one or more diodes operatively coupled to the one or more slip rings to the one or more warning lights (140).

3. The carbon brush (144) of claim 2, wherein the one or more diodes comprise a battery output diode (136) operatively coupled to a battery (100), a diode trio output diode (138) operatively coupled to a diode trio (124), or a combination thereof.

4. The carbon brush (144) of claim 2, wherein the lifespan current comprises an alternating current, wherein the alternating current is delivered through a rectifier (128) operatively coupled to the one or more slip rings and the one or more warning lights (140), configured to convert the alternating current into a direct current.

5. The carbon brush (144) of claim 1, wherein the carbon block (145) further comprises a copper interior component.

6. An alternator device comprising:

a. a shaft component (149) defining an axis;

b. a rotor component (150) disposed on the shaft component (149), configured to rotate on the axis upon receiving a first current and a rotation force;

c. one or more slip rings disposed along the shaft, configured to receive the first current and deliver the first current to the rotor component (150);

d. one or more carbon brushes disposed adjacent to the one or more slip rings such that the one or more carbon brushes contact the one or more slip rings, each carbon brush (144) comprising a carbon block (145) configured to deliver the first current to the one or more slip rings and a health sensor operatively coupled to the carbon block (145) configured to detect a lifespan of the carbon block (145) and alert a user when the lifespan reaches a predetermined threshold; and e. a battery (100) operatively coupled to the one or more carbon brushes, configured to deliver the first current to the one or more carbon brushes;

wherein alerting the user when the lifespan reaches the predetermined threshold comprises actuating one or more warning lights (140) operatively coupled to the one or more slip rings;

wherein the health sensor comprises a carbon tube sensor (142) comprising a thermal insulator layer (152), disposed within the carbon block (145) such that when the carbon block (145) reaches the predetermined threshold, the thermal insulator layer (152) is at least partially removed and the carbon tube sensor (142) contacts the one or more slip rings such that a lifespan current is delivered to the one or more warning lights (140).

7. The alternator device of claim 6, wherein the lifespan current is delivered through one or more diodes operatively coupled to the one or more slip rings to the one or more warning lights (140).

8. The alternator device of claim 7, wherein the one or more diodes comprise a battery output diode (136) operatively coupled to the battery (100), a diode trio output diode (138) operatively coupled to a diode trio (124) operatively coupled to a stator component (120), or a combination thereof.

9. The alternator device of claim 7, wherein the lifespan current comprises an alternating current, wherein the alternating current is delivered through a rectifier (128) operatively coupled to the one or more slip rings and the one or more warning lights (140), configured to convert the alternating current into a direct current.

10. The alternator device of claim 6, wherein the carbon block (145) further comprises a copper interior component.

11. The alternator device of claim 6 further comprising a stator component (120) disposed adjacent to the rotor component (150), comprising a stator magnet system, wherein the rotor component (150) comprises a rotor magnet system, wherein the stator magnet system is configured to generate a second current upon interacting with the rotor magnet system as the rotor component (150) rotates.

12. The alternator device of claim 11 further comprising a rectifier (128) operatively coupled to the battery (100) and the stator component (120), wherein the second current comprises an alternating current, wherein the rectifier (128) is configured to convert the alternating current into a direct current.

13. The alternator device of claim 11, wherein the stator component (120) is operatively coupled to the battery (100) such that the second current is delivered to the battery (100), a plurality of external batteries such that the second current is delivered to the plurality of external batteries, or a combination thereof.

14. The alternator device of claim 6 further comprising a regulator (134) operatively coupled to the one or more carbon brushes and the battery (100), configured to regulate an amount of power in the first current.

15. An alternator system comprising:

a. a shaft component (149) defining an axis;

b. a rotor component (150) disposed on the shaft component (149), comprising a rotor magnet system, configured to rotate on the axis upon receiving a first current and a rotation force;

c. one or more slip rings disposed along the shaft, configured to receive the first current and deliver the first current to the rotor component (150);

d. one or more warning lights (140) operatively coupled to the one or more slip rings;

e. one or more carbon brushes disposed adjacent to the one or more slip rings such that the one or more carbon brushes contact the one or more slip rings, each carbon brush (144) comprising a carbon block (145) configured to deliver the first current to the one or more slip rings and a health sensor operatively coupled to the carbon block (145) configured to detect a lifespan of the carbon block (145) and alert a user when the lifespan reaches a predetermined threshold;

wherein the health sensor comprises a carbon tube sensor (142) comprising a thermal insulator layer (152), disposed within the carbon block (145) such that when the carbon block (145) reaches the predetermined threshold, the thermal insulator layer (152) is at least partially removed and the carbon tube sensor (142) contacts the one or more slip rings such that a lifespan current is delivered to the one or more warning lights (140) such that the one or more warning lights (140) turn on;

f. a battery (100) operatively coupled to the one or more carbon brushes, configured to deliver the first current to the one or more carbon brushes;

g. a stator component (120) disposed adjacent to the rotor component (150), comprising a stator magnet system, configured to generate a second current upon interacting with the rotor magnet system as the rotor component (150) rotates;

h. a rectifier (128) operatively coupled to the battery (100) and the stator component (120), configured to convert the second current into a direct current; and i. a regulator (134) operatively coupled to the one or more carbon brushes and the battery (100) and a diode trio (124), configured to regulate an amount of power in the first current and the second current.

* * * * *